United States Patent [19]

Klokkers et al.

[11] Patent Number: 4,569,010
[45] Date of Patent: Feb. 4, 1986

[54] HIGH VOLTAGE POWER SUPPLY

[75] Inventors: Frits H. Klokkers; Wilhelmus B. Sleumer, both of Almelo, Netherlands

[73] Assignee: U.S. Philips Corporation, New York, N.Y.

[21] Appl. No.: 576,491

[22] Filed: Feb. 2, 1984

[30] Foreign Application Priority Data

Feb. 18, 1983 [GB] United Kingdom ................ 8304506

[51] Int. Cl.$^4$ ............................................. H02M 7/06
[52] U.S. Cl. ....................................... 363/68; 363/126
[58] Field of Search ...................... 363/59, 60, 61, 68, 363/126; 336/69, 206

[56] References Cited

FOREIGN PATENT DOCUMENTS 1090995 3/1966 United Kingdom .

Primary Examiner—Peter S. Wong
Assistant Examiner—Judson H. Jones
Attorney, Agent, or Firm—Robert T. Mayer; Bernard Franzblau

[57] ABSTRACT

A compact high voltage power supply includes a high voltage transformer 4 with individual concentric secondaries S1, S2, ... , connected to form a ladder network with two series-connected assemblies of diode rectifiers R and R' respectively located on corresponding sides of the transformer winding. Next-adjacent secondaries S1, S2, ... , are wound from the same side of the winding space but in an opposite winding sense, and each secondary comprises an odd plurality of layers. This provides a high voltage transformer arrangement without cross-connection of the diodes in which the peak and alternating voltages across the interwinding insulation is optimally reduced and the smoothing effect of stray capacitances is enhanced.

11 Claims, 16 Drawing Figures

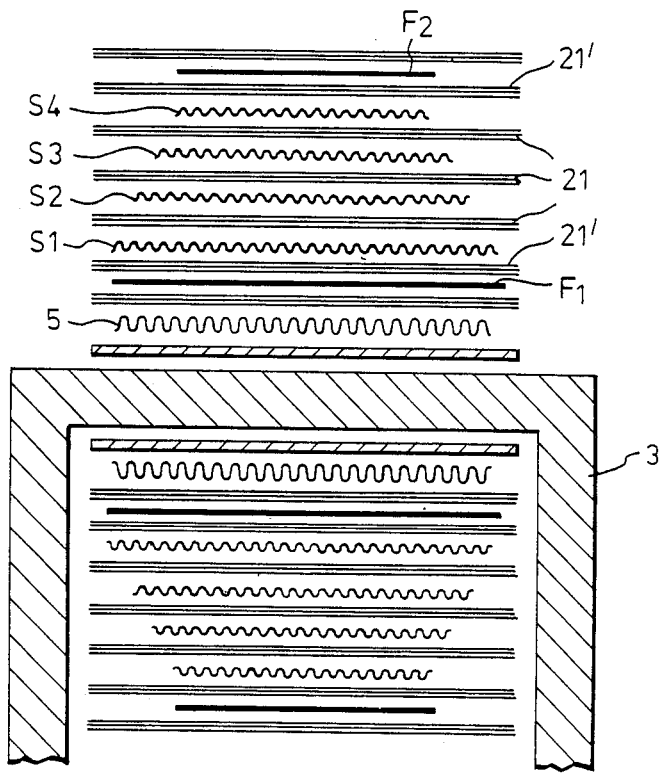
Fig. 9.
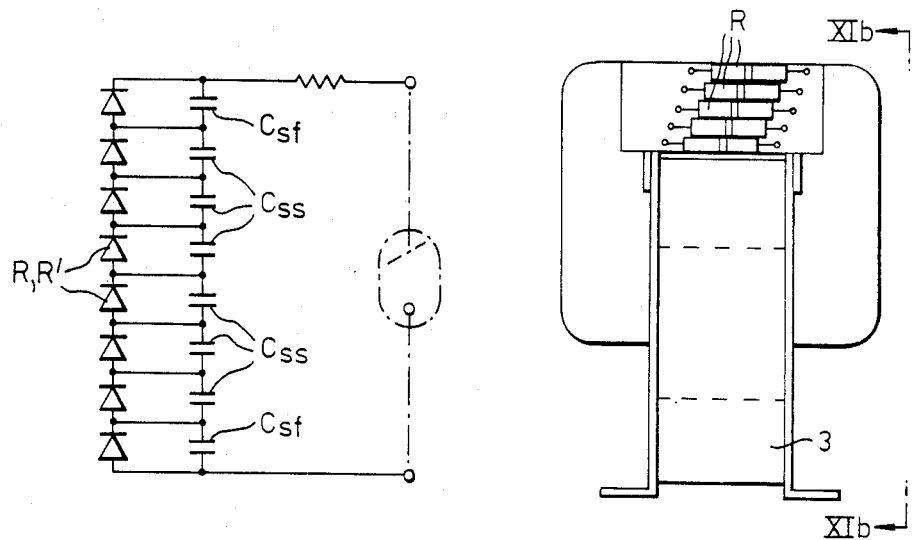
Fig. 8.
Fig. 11a.

HIGH VOLTAGE POWER SUPPLY

This invention relates to a high voltage power supply including a transformer and rectifier assembly in which the high-voltage secondary of the transformer comprises a plurality of concentric individual windings and each end of each secondary winding is connected via a respective rectifier to a corresponding end of the next adjacent winding or to a high voltage supply connection so that the assembly provides a full wave rectified output. Such a high-voltage power supply will be referred to hereinafter as a high-voltage power supply of the kind specified.

A high voltage power supply of the kind specified is disclosed in FIG. 13 of U.K. Patent Specification No. 1,090,995, and is illustrated herein in FIG. 1, in which each secondary winding S1, S2, S3, S4 comprises a single layer winding and the rectifiers are cross-connected to opposite sides of the winding space. The arrangement therein disclosed has the advantage that each interwinding stray capacitance is bridged in operation by a uniform quasi-steady rectified voltage enabling it to perform the function of a smoothing capacitance, and permitting less insulation to be used and to be of a kind having a higher dielectric loss factor and therefore less costly. However, the need for the rectifiers to be connected across from one side of the winding to the other causes difficulty in the provision of sufficient insulation, and causes the assembly to be rather bulky.

It would be advantageous therefore if each rectifier were connected between those ends of adjacent windings which are disposed on the same side of the winding, and this can be done if the adjacent secondary winding layers are wound from opposite sides of the winding area as illustrated in FIG. 2. In this diagram those rectifiers which conduct during a first half cycle are labelled with a plus sign and those which conduct during the other half cycle are labelled with a minus sign.

FIGS. 3a and 3b are voltage diagrams illustrating the potential distribution along the windings S1 from A to B and S2 from C to D at the peaks of the first and second half cycles respectively. Each winding layer generates a peak voltage indicated by e.

Thus during a first half cycle the end A of the winding S1, will be at the negative high voltage supply potential 10', the end B of S1 and the end C of S2 will be at the same potential e above the negative high voltage connection and the end D of S2 will be at a potential 2e relative to the end A of S1. Thus, as illustrated in FIG. 3a by the shaded region, the insulation between the windings S1 and S2 will be subjected to an electric field ranging from zero to twice the voltage V provided by a single winding. At the peak of the other half cycle, illustrated by FIG. 3b, the electric field distribution across the interwinding insulation is laterally reversed. Thus during a cycle of alteration, the insulation between the ends A and D and between the ends B and C of the secondaries S1 and S2 is subject to an alternating potential difference of 2e peak to peak and must not only be sufficiently thick to withstand this voltage but must also have a low dielectric loss factor because of the large alternating field component in these regions.

It may be thought that the arrangement of FIG. 2 could be improved by winding each individual secondary S1, S2, . . . , as several layers, e.g three layers as illustrated in FIG. 4. However, corresponding voltage diagrams in FIGS. 5a and 5b show that very little change occurs in the demands made on the interwinding insulation.

Again the shaded region indicates the interwinding potential distribution, and it is assumed that each layer develops a voltage $e'$ between the ends thereof, Since each winding is shown as three layers, the voltage V to be developed by a secondary winding will be $3e'$ but it will be assumed for comparison that an individual secondary will generate the same voltage V in the various cases discussed, therefore the value of e in the arrangement of FIG. 2 will be three times the value of $e'$ in that of FIG. 4.

When the first half cycle is considered, see FIG. 5a, the potential across the interlayer insulation varies from $2e'$ between the ends A of S1 and D of S2 to zero between the ends B of S1 and C of S2 since the first 'plus' diode on the right in the figure provides a short circuit. In the other half cycle shown in FIG. 5b, however, while the voltage between the end A of S1 and the end D of S2 only doubles to $4e'$ which is still less than the voltage 2e for the circuit in FIG. 2, the voltage between the end B of S1 and the end C of S2 will increase from zero to a value $6e'$ which is twice the secondary voltage $V=3e'$, and is in fact as great as in the case of the arrangement shown in FIG. 2, and provides a correspondingly larger alternating component. Since the amount of insulation present must be sufficient for the worst situation along the windings, the arrangement of FIG. 4 will not permit any reduction in the cost of insulation either by reducing the amount or allowing a cheaper material with a higher dielectric loss factor to be employed. Furthermore the presence of a large alternating voltage component will reduce the charge storage effect available for smoothing purposes.

It is an object of the invention to provide an improved high voltage power supply of the kind specified in which the rectifier diodes are connected so as not to cross from one side of the winding to the other, while enabling less insulation to be employed at reduced cost.

According to the invention there is provided a high voltage power supply of the kind specified characterised in that next-adjacent windings are wound in the opposite winding sense starting from the same side of the winding, that each winding comprises an odd plurality of winding layers, and that for each pair of next adjacent windings each rectifier is connected to the ends of the respective adjacent windings, which lie on the same side of the windings.

The invention is based on the realisation that by starting all of the secondary windings from the same side of the winding region, and winding each secondary with an odd plurality of layers but in an opposite winding sense for each next-adjacent pair of secondaries, a winding arrangement is provided which, when connected to respective in-line connections of rectifiers at the corresponding ends of the windings, will result in a quasi-steady voltage difference being set up between the facing conductive areas of adjacent secondary windings, and which form the interwinding stray capacitance. In this way, the potential difference between adjacent windings can be reduced, thus reducing the amount of insulation required and, because the potential difference is quasi-steady in operation, this will permit a less expensive insulation material exhibiting a higher loss factor to alternating potentials to be satisfactorily employed, and can enable a significant and useful capacitance smoothing effect to be provided.

An embodiment of a high voltage power supply in accordance with the invention is characterised in that an inductively open-circuit layer of electrically conductive foil is disposed adjacent but insulated from the inner surface of the innermost secondary winding and electrically connected to that high voltage supply conductor to which the ends of the innermost secondary winding are connected via respective rectifiers. The embodiment can be further provided with an inductively open-circuit foil layer disposed in insulated manner adjacent the outer surface of the outermost secondary winding and similarly connected to the other high voltage supply conductor. In this way corresponding stray capacitances are provided so as to bridge each of the rectifiers so as to provide protection from reverse breakdown in the event of a flash-over.

Preferably the successive secondary windings or foil layer of larger diameter is each made smaller in width, i.e. shorter in winding length, so as to present substantially the same conductive surface area to each next adjacent winding. In this way the corrsponding shunt stray capacitances can be made substantially the same magnitude to equalise the reverse potential distribution across the rectifier diodes.

Preferably an even number of secondary windings are employed to ensure that the ripple component of the rectified output is mainly at twice the frequency of the alternating supply to the primary of the high voltage transformer, thus facilitating smoothing.

Figure 6:
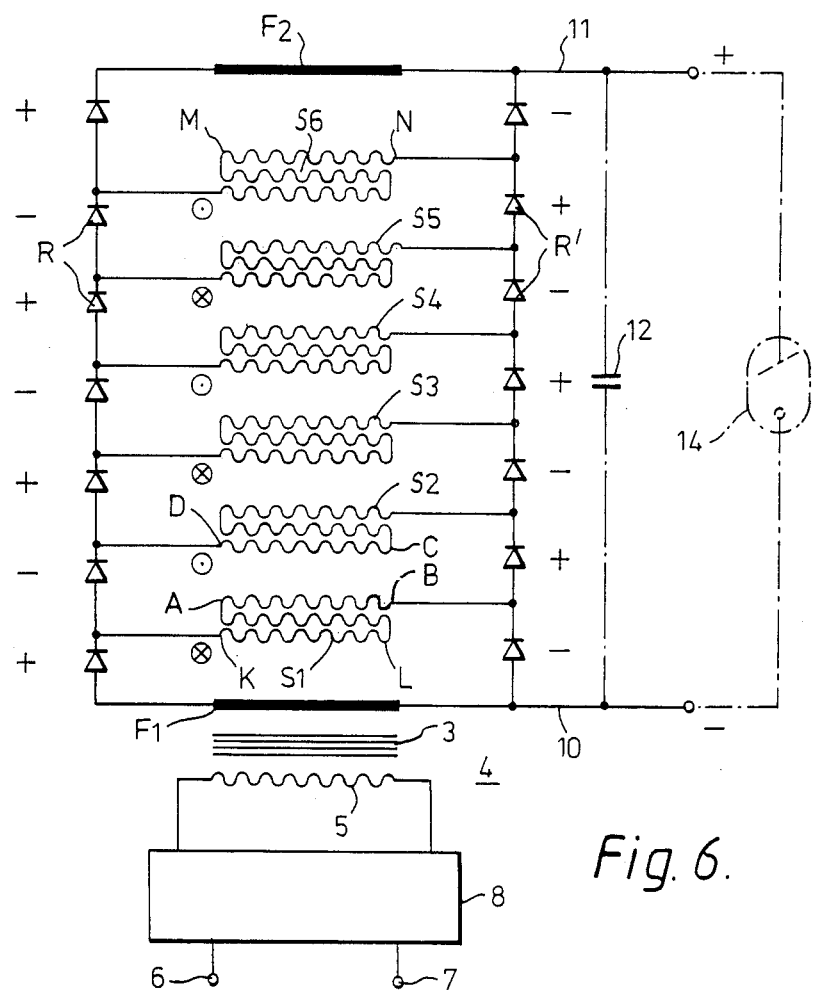
Figures 7A, 7B:
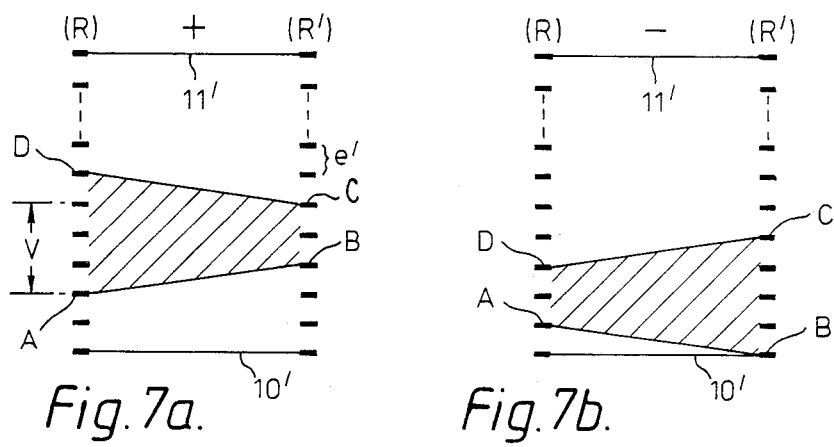
Figure 11B:
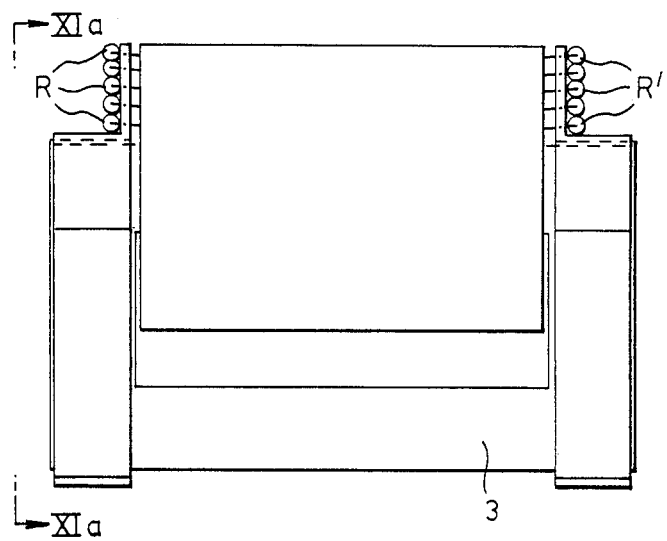
Figures 10A, 10B:
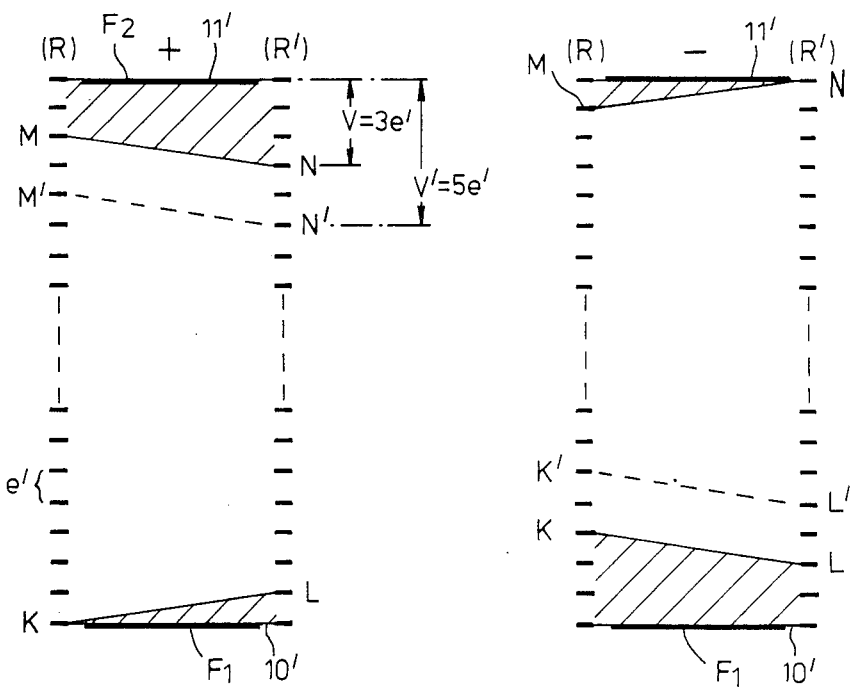

An embodiment of the invention will now be described by way of example, with reference to FIGS. 6 to 11 of the accompanying drawings, in which:

FIG. 6 is a schematic diagram illustrating a high voltage power supply in accordance with the invention, FIGS. 7a and 7b are voltage diagrams relating to the operation of FIG. 6, FIG. 8 is an equivalent circuit of FIG. 6, FIG. 9 illustrates the winding area of the transformer employed in FIG. 6, FIGS. 10a and 10b are further voltage diagrams relating to the operation of FIG. 6, and FIGS. 11a and 11b illustrate the construction of a transformer-rectifier assembly in accordance with the invention.

A high voltage power supply for supplying an X-ray tube and embodying the invention is illustrated schematically in FIG. 6, and comprises a high voltage transformer 4 whose primary winding 5 is fed with an alternating voltage suitably supplied either directly from a public supply mains via connections 6 and 7, or from conversion means included in the block 8, which provides an alternating supply at a frequency of several kHz from a source of direct current, such as an accumulator, or by rectification from the supply mains 6,7. A higher excitation frequency will reduce output ripple and enable a smaller core 3 to be employed, thus saving weight.

The high voltage secondary of the transformer 4 comprises a plurality of concentric individual secondary windings S1, S2, . . . , and each end of each secondary winding is connected via a respective rectifier R or R' of a corresponding series connection of rectifiers, to a corresponding end of the next adjacent winding or to one of two high voltage suppply connections 10, 11, so that the asembly provides a full wave rectified output across an output smoothing capacitor 12 to feed an X-ray tube 14 connected to the high voltage connections 10, 11. The smoothing capacitor 12 may be low in value and may even be omitted when the excitation frequency is relatively high and the output current low since the winding stray capacitance may then provide sufficient smoothing. This general form of high voltage power supply arrangement is sometimes referred to as a diode split staircase generator.

In accordance with the invention, next-adjacent secondary windings S1, S2, S3, . . . are wound in the opposite winding sense as indicated by the symbols and , starting from the same side of the winding area, e.g. the left-hand side in FIG. 6, and each winding comprises an odd plurality of winding layers. Only three winding layers are shown for each secondary, but for reasons given hereinafter it is preferable that a greater number of layers should be used. For each pair of next-adjacent secondary windings S1, S2, each rectifier R or R' is connected to the ends of the respective adjacent windings which lie on the same side of the windings, e.g. in FIG. 6 on the left and on the right, respectively.

Figure 1:
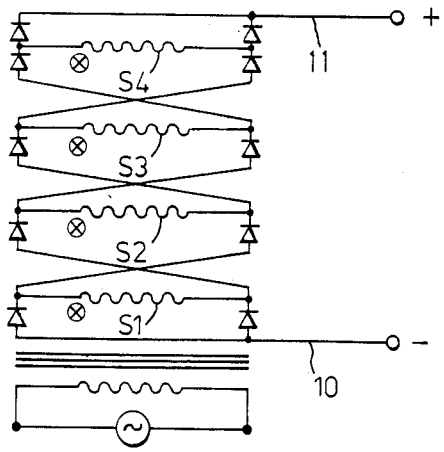
FIG. 1 is a prior art power supply.
Figures 2, 4:
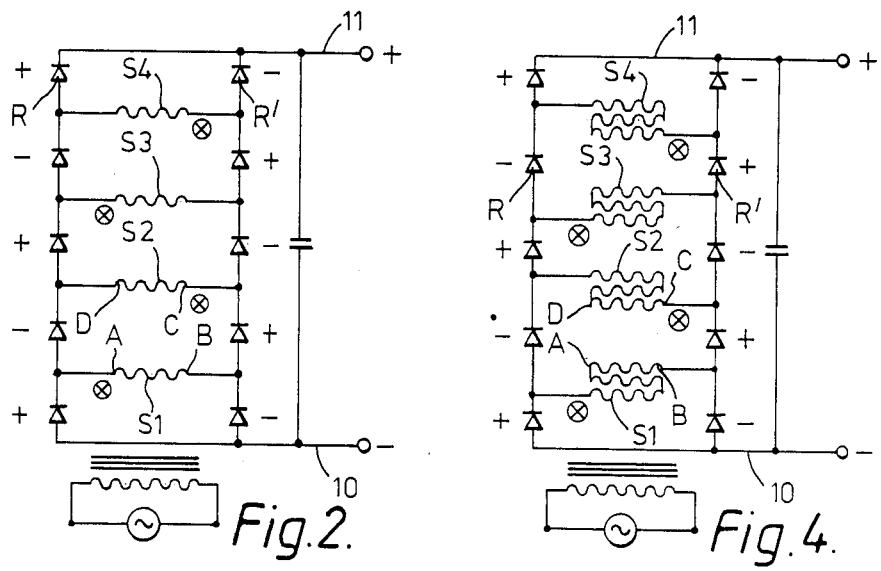
FIG. 2 illustrates the power supply of FIG. 1 with the adjacent secondary winding layers wound from opposite sides.
FIG. 4 illustrates the power supply of FIG. 2 with each individual secondary having several layers.
Figures 3A, 3B, 5A, 5B:
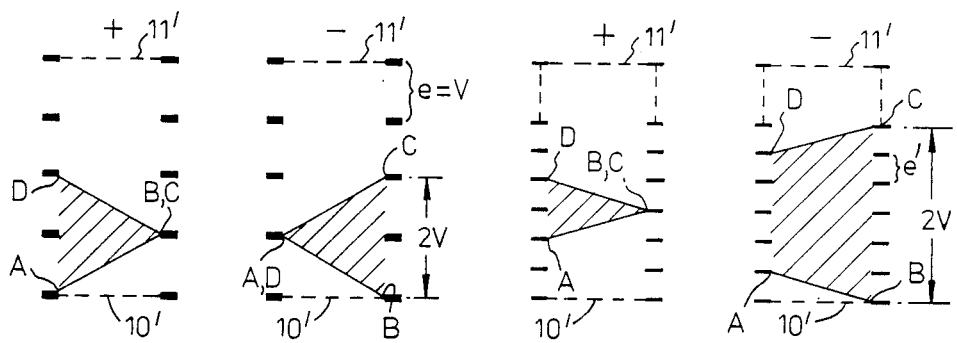
FIGS. 3a and 3b are voltage diagrams relating to the operation of FIG. 2.
FIGS. 5A and 5B are voltage diagrams relating to the operation of FIG. 4.

FIGS. 7a and 7b are voltage diagrams illustrating the voltage distribution, shaded region, between the outer surface of winding S1 and the inner surface of the next adjacent winding S2 in the arrangement of FIG. 6, and to which a conventional layer of insulation (not shown) separating the windings would be subject. It is apparent from FIG. 7a that at the peak of a first half cycle, the voltage between the end A of S1 and the end D of S2, will be $4e'$, and that between the end B of S1 and the end C of S2 will be $2e'$, where $e'$ is the voltage induced in each winding layer. At the peak of the other half cycle, FIG. 7b, the situation will be reversed. Thus it will be seen that the alternating component at each end of the insulation layer will only have a peak to peak excursion of $2e'$, i.e. $\frac{2}{3}$ V, where V is the voltage induced in each individual secondary winding, and the maximum voltage present across the insulation layer will be $4e'$, i.e. $1\frac{1}{3}$ V. This compares favourably with the corresponding values of 2 V and 2 V, respectively, for the arrangement shown in FIG. 4. This means that by only employing three winding layers in each secondary, the arrangement of FIG. 6 can considerably reduce the maximum alternating voltage component across the insulation layer from 2 V to $\frac{2}{3}$ V and hence the dielectric losses, and can significantly reduce the peak value of the interwinding voltage across the layer. If a greater number of winding layers were employed in each secondary winding S1, S2 in the arrangement shown in FIG. 6, the magnitude of the alternating voltage component will be correspondingly reduced to a smaller fraction of the secondary voltage V, and the peak voltage between the windings will tend towards the value V.

Thus if, for example, 5 winding layers were employed, the alternating peak to peak excursion of $2e'$ would only represent 2/5 V, and the peak interwinding voltage of $6e'$ would represent only 6/5 V. Corresponding reductions would occur as the number of winding layers per individual secondary winding are increased. This is in contrast to the situation occurring in the arrangement of FIG. 4 in which the corresponding values would remain unaltered with an increasing number of winding layers per secondary.

In experiments conducted on an example of a power supply in accordance with the invention employing individual secondary-windings each having several, for example 7, winding layers, it was found practicable to depart from the normal rule concerning the breakdown strength of insulation materials, namely 3.1 Vt/$\mu$ insulation for voltages of or above 500 V$_{rms}$, and to use values of from 16 to 20 Vt/$\mu$ satisfactorily with significant savings in cost, where t is the peak value of the alternating voltage and $\mu$ is the thickness of the insulation in $\mu$ meters.

It will be apparent that the facing surfaces of adjacent secondary windings together with the layer of insulation therebetween will form a capacitance, an interwinding stray capacitance, and as can be seen from FIGS. 7a and 7b, there will in operation be a significant direct component of electric field across the insulating layer indicating a corresponding amount of charge energy storage which can contribute to the smoothing of the rectified output. More important is the fact that the interwinding stray capacitances $C_{ss}$ are each effectively connected across a corresponding pair of rectifiers R, R', as illustrated in the equivalent circuit of FIG. 8 in which the secondary windings are not represented. The presence of these capacitances can reduce the risk of damage to the corresponding rectifiers in the event of a flash-over in the rectified high tension circuit which can result in the application of a reverse voltage across the rectifiers, and if this is not equally distributed between the individual rectifiers, damage or destruction can result.

The rectifiers at each end of the ladder network and which respectively connect the first and last windings to a corresponding high voltage supply conductor do not have an interwinding capacitance in parallel. External capacitors can be connected to provide protection for these rectifiers. However, protection can alternatively be obtained by arranging respective inductive open-circuit layers of electrically conductive foil $F_1$, $F_2$, adjacent the inner surface of the innermost secondary and the outer surface of the outermost secondary, and connecting each foil to the corresponding high voltage supply conductor 10, 11, which is connected to the adjacent winding via the rectifiers to be protected. The presence of the corresponding stray capacity is indicated in FIG. 8 by $C_{sf}$.

FIG. 9 illustrates the manner in which successive secondary windings are disposed concentrically one over the other within the winding cross sectional area of the transformer. For the sake of clarity only four secondary windings S1, S2, S3, S4, are shown in FIG. 9. The primary winding 5 is wound first next to the central part of the core, followed, after an open circuit layer $F_1$ of conducting foil, in succession by the secondary windings S1, S2, . . . , the winding widths of which are made smaller in correspondence with the increase in the effective voltage of that winding as it is connected further up the series connection of rectifiers, relative to the potential of the core 3, and of its supporting bracket. In the arrangement shown, the core will be at or about ground potential as will the negative conductor 10 of the high voltage supply. In this way the risk of voltage breakdown between the ends of the secondary windings and the side portions of the core and supporting bracket will be reduced and can be minimised.

It should be noted that the invention is equally applicable to a high voltage power supply in which the positive high tension terminal is to be at or near the core potential, e.g. ground. In that case the connections of the rectifiers in FIG. 6 would all be reversed so as to reverse the potential between the conductors 10 and 11.

It will be apparent from FIG. 9 that the secondaries S1, S2, S3, . . . , are of successively greater diameter, and it is therefore convenient to arrange the dimensions such that the conductive surface area presented by each secondary winding to the next adjacent secondary winding, or foil when present is of substantially the same magnitude for all the secondaries. By using interwinding insulation 21, 21', having the same thickness and dielectric constant, all of the interwinding stray capacitances can be made to have substantially the same magnitude with the result that any reverse potential occurring under flash-over fault conditions will be divided equally between the various rectifiers. If, however, it should be necessary to use an interwinding insulation, say for layers 21', which has a different dielectric constant from that of the other layers 21, the stray capacitance can still be made the same by using an appropriately different thickness of material.

It should be noted that if the foil layers $F_1$ and $F_2$ are employed to provide protective capacitances for the corresponding end rectifiers, the insulation layers 21' between the winding and the foil may have the same thickness as the interwinding layers 21. However, in addition, the insulating foils 21' must be of low dielectric loss because the potential across those layers will consist almost entirely of an alternating component as can be seen from FIGS. 10a and 10b. These figures represent voltage diagrams showing the voltage difference, shaded, between the respective foils $F_1$, $F_2$ and the corresponding facing surfaces KL of secondary winding S1, and MN of S2 as shown in FIG. 6, during the first and the other half cycle, respectively. The voltage steps represent the voltage e' generated by each layer of the secondary winding as in the case of FIGS. 7a and 7b, and if a greater number of layers were used per secondary, the line MN in FIG. 10a and the line KL in FIG. 10b would be shifted away from the corresponding high voltage conductor potential 11' and 10', as indicated by the dashed line for 5 layers. Thus as the number of layers per winding increases so will the lines be more parallel to the axes 11', 10', when the diagrams are correspondingly scaled down to correspond to the same V.

Although the potential across the end stray capacitors $C_{sf}$ alternates between V and zero on alternate half cycles, each capacitor will nevertheless hold the charge applied at the peak of the wave and will behave as a reservoir capacity until the opposite peak occurs which reduces the charge to zero. In the embodiment of FIG. 6 illustrated by FIGS. 10a and 10b, an even number of individual secondary windings are employed, and it will be seen from FIG. 10 that the two capacitances $C_{sf}$ will respectively store a peak rectified charge during alternate half cycles, and any corresponding ripple will be of twice the frequency of the transformer input. It will be apparent that the alternating voltages between the outermost surfaces of adjacent pairs of secondary windings will substantially cancel for an even number of secondaries, enabling the capacitances $C_{ss}$ and $C_{sf}$ in series to act as a useful, and under favourable conditions the entire smoothing capacity.

When an odd number of secondary windings are employed the situation is somewhat different. In that case both capacitances $C_{sf}$ are charged during one half cycle and are discharged during the other, and the alternating voltage between the outer surfaces of one of the secondaries will remain uncancelled. The effect of this is for the transformer-rectifier assembly to tend to generate a slightly greater amount of ripple with a significant fundamental component. This need not be important when a sufficiently large storage capacitor 12 is employed. However, the use of an even number of individual secondary windings is to be preferred.

The compact form of a high voltage power supply in accordance with the invention can be seen from FIGS. 11a and 11b which shows a transformer-rectifier assembly using non-crossing diodes and embodying the invention.

While a high voltage power supply for supplying an X-ray tube has been described herein by way of example, a high voltage power supply in accordance with the invention may be usefully employed to supply any high voltage low current device, such as a cathode ray tube, an X-ray image intensifier, or an ionisation detector, or a radar high voltage supply, and can be advantageously used in portable equipment.

What is claimed is:

1. A high voltage power supply comprising a transformer and rectifier assembly wherein a high-voltage secondary of the transformer comprises a plurality of concentric individual secondary windings with each end of each secondary winding connected via a respective rectifier to a corresponding end of the next adjacent winding or to a high voltage supply connector so that the assembly provides a full wave rectified output characterised in that next-adjacent windings are wound with an opposite winding sense starting from the same side of the winding, that each winding comprises an odd number of winding layers, and that for each pair of next adjacent windings each rectifier is connected to the ends of the respective adjacent windings which lie on the same side of the windings.

2. A power supply as claimed in claim 1, including an innermost secondary winding with ends and an inner surface, wherein an inductively open-circuit layer of electrically conductive foil is disposed adjacent the inner surface of the innermost secondary winding and is electrically connected to the high voltage supply conductor to which the ends of said innermost secondary winding are connected via respective rectifiers.

3. A power supply as claimed in claim 1 including an outermost secondary winding with ends and an outer surface, wherein an inductive open-circuit layer of electrically conductive foil is disposed adjacent the outer surface of the outermost secondary winding and is electrically connected to the high voltage supply conductor to which the ends of said outermost secondary winding are connected via respective rectifiers.

4. A power supply as claimed in claim 1 wherein successive said secondary windings have a larger diameter and are made smaller in width so as to present substantially the same magnitude of conductive surface area to the next adjacent winding.

5. A power supply as claimed in claim 1 wherein the high voltage secondary of the transformer comprises an even number of individual secondary windings.

6. A power supply as claimed in claim 2 including an outermost secondary winding with ends and an outer surface, wherein an inductively open-circuit layer of electrically conductive foil is disposed adjacent the outer surface of the outermost secondary winding and is electrically connected to the high voltage supply conductor to which the ends of said outermost secondary winding are connected via respective rectifiers.

7. A power supply as claimed in claim 2 wherein successive said secondary windings have a larger diameter and are made smaller in width so as to present substantially the same magnitude of conductive surface area to the next adjacent winding.

8. A power supply as claimed in claim 3 wherein successive said secondary windings have a larger diameter and are made smaller in width so as to present substantially the same magnitude of conductive surface area to the next adjacent winding.

9. A power supply as claimed in claim 2 wherein the high voltage secondary of the transformer comprises an even number of individual secondary windings.

10. A power supply as claimed in claim 3 wherein the high voltage secondary of the transformer comprises an even number of individual secondary windings.

11. A power supply as claimed in claim 4 wherein the high voltage secondary of the transformer comprises an even number of individual secondary windings.

* * * * *

UNITED STATES PATENT AND TRADEMARK OFFICE
CERTIFICATE OF CORRECTION

PATENT NO. : 4,569,010

DATED : February 4, 1986

INVENTOR(S) : FRITS H. KLOKKERS
WILHELMUS B. SLEUMER

It is certified that error appears in the above-identified patent and that said Letters Patent is hereby corrected as shown below:

COL. 7, Line 35, change "connector" to --conductor--.

COL. 7, Line 36, insert --,-- after output.

Signed and Sealed this

Fourth Day of November, 1986

[SEAL]

Attest:

DONALD J. QUIGG

Attesting Officer      Commissioner of Patents and Trademarks